US006331567B1

(12) United States Patent
Watson et al.

(10) Patent No.: US 6,331,567 B1
(45) Date of Patent: Dec. 18, 2001

(54) EDIBLE COMPOSITION CONTAINING ZINC AND LINOLEIC ACID

(75) Inventors: Timothy David George Watson, Lochwinnoch; Katrina Anne Marsh, Waltham-on-the-Wolds, both of (GB)

(73) Assignee: Mars UK Limited, Slough (GB)

( * ) Notice: Subject to any disclaimer, the term of this patent is extended or adjusted under 35 U.S.C. 154(b) by 0 days.

(21) Appl. No.: 09/096,471

(22) Filed: Jun. 12, 1998

Related U.S. Application Data

(60) Provisional application No. 60/064,288, filed on Nov. 6, 1997.

(30) Foreign Application Priority Data

Jun. 13, 1997 (GB) .................................................. 9712420

(51) Int. Cl.$^7$ ........................... A61K 31/20; A61K 33/32
(52) U.S. Cl. ......................... 514/560; 514/557; 424/641; 424/642
(58) Field of Search .................... 424/640, 641, 424/71; 514/557, 560

(56) References Cited

U.S. PATENT DOCUMENTS

| | | |
|---|---|---|
| 4,208,429 | 6/1980 | Fraser .................................... 424/312 |
| 5,200,218 | 4/1993 | Lasater et al. ......................... 426/72 |
| 5,308,832 * | 5/1994 | Garleb et al. .......................... 514/2 |

FOREIGN PATENT DOCUMENTS

| | | | |
|---|---|---|---|
| 3782895 | 11/1995 | (AU) | ........................................ 1/29 |
| 3786995 | 11/1995 | (AU) | ........................................ 1/29 |
| 0003407 | 8/1979 | (EP) | ........................................ 33/30 |
| 0037175 | 7/1981 | (EP) | ........................................ 31/425 |
| 0366869 | 9/1990 | (EP) | ........................................ 37/56 |

OTHER PUBLICATIONS

Fraser, Coat conditioning method and composition for dogs and cats; US patent 4,208,429 ( see abstract caplus enclosed, AN 1980:531189), Jun. 17, 1980.*

Campbell, Karen L., Clinical Use of Fatty Acid Supplements in Dogs; Veterinary Dermatology, vol. 4, No. 4, pp. 167–173, 1993.

Miller, William H., Nutritional Considerations in Small Animal Dermatology, Veterinary Clinics of North America: Small Animal Practice, vol. 19, No. 3, pp. 497–511, May 1989.

Lloyd, H. D., Essential fatty acids and skin disease, Journal of Small Animal Practice (1989) 30, 207–212.

The Waltham Book of Dog & Cat Nutrition, 2$^{nd}$ Ed., A Handbook for Veterinarians and Students, Editor: A. T. B. Edney, Pergamon Press; Chapter 4, A Balanced Diet, pp. 57–74. (1988).

Campbell, Karen L., Fatty Acid Supplementation and Skin Disease, Veterinary Clinics of North America: Small Animal Practice, vol. 20, No. 5, pp. 1475–1486, Nov. 1990.

Codner, Ellen C. and Thatcher, Craig D., Nutritional Management of Skin Disease, The Compendium, vol. 15, No. 3, pp. 411–423, Mar. 1993.

Campbell, Karen L., Therapeutic Indications for Dietary Lipids, (1991).

White, Patricia D., Essential Fatty Acids: Use in Management of Canine Atopy; The Compendium, vol. 15, No. 3, pp. 451–457, Mar. 1993.

Bourdeau, P. and Ibisch, C., Zinc Increases Cultured Canine Keratinocytes Growth and Acts with Higher Toxity on Neoplastic Cells; World Veterinary Derm. Congress, Edinburgh, 1996, p. 130.

Cunnane, Stephen C., Evidence that adverse effects of zinc deficiency on essential fatty acid composition in rats are independent of food intake, British Journal of Nutrition (1988), 59, 273–278.

Monson, William J., Supplemental Nutrients for Skin and Haircoat Condition, Canine Practice–Nutrition/Dermatology, vol. 8, No. 1, pp. 32–37, Jan–Feb. 1981.

Bettger, William J., et al., Interaction of Zinc and Essential Fatty Acids in the Rat, J. Nutr.; 109, 480–488, 1979.

EfaVet® product literture, Schering–Plough Animal Health, (1992).

Mirra–Coat product literture, Shetland Oy, (no date).

Nutro's Five Point Programme for Healthy Skin and Coat brochure, (no date).

* cited by examiner

*Primary Examiner*—Theodore J. Criares
(74) *Attorney, Agent, or Firm*—Fulbright & Jaworski L.L.P.

(57) ABSTRACT

A diet or foodstuff for enhancing and/or improving the skin and coat condition of an animal has (A) zinc at a concentration of at least 28 mg/400 kcal and linoleic acid at a concentration of at least 4 g/400 kcal; or (B) zinc at a concentration of at least 20 mg/400 kcal and linoleic acid at a concentration of at least 6 g/400 kcal. A dietary supplement, topical application, and a method are also disclosed.

33 Claims, 2 Drawing Sheets

EDIBLE COMPOSITION CONTAINING ZINC AND LINOLEIC ACID

This application claims the benfit of, U.S. provisional application No. 60/064,288 filed Nov. 6, 1997.

BACKGROUND OF THE INVENTION

1. Field of the Invention

The present invention relates to a diet or foodstuff and a dietary supplement useful in enhancing and/or improving the skin and coat condition of an animal or person. The present invention also relates to the use of the diet/foodstuff and dietary supplement in enhancing and/or improving the skin and coat composition of an animal or person and to processes for the preparation of the diet/foodstuff and dietary supplement.

2. Related Background Art

In most household pets, a healthy skin and coat indicates an animal in general good health. Since skin and coat problems are common in household pets, much research has gone into providing diets which repair deteriorations in skin and coat conditions, thus providing a basic level of healthy skin and coat.

W. H. Miller, Veterinary Clinics of North America: Small Animal Practice, Vol. 19, No. 3, May 1989, pages 497–511; K. L. Campbell, Veterinary Dermatology, Vol. 4, No. 4 (1993), pages 167–173; and D. H. Lloyd, Journal of Small Animal Practice (1989) 30, pages 207–212, the disclosure of each of which is incorporated by reference herein, showed that dietary deficiencies in zinc or linoleic acid produce deterioration in skin and coat conditions in dogs and cats. Such deteriorations are reversed when the animal is fed a complete and balanced food including a high quality commercial food. There is no suggestion that a combination of zinc with linoleic acid would enhance or improve skin and coat conditions, even in healthy animals.

Levels of nutrients in pet foods are well documented as to the provision of a complete and balanced food for healthy animals. Variations on individual ingredients are usually kept within well defined limits. Concentrations of individual ingredients far in excess of these limits may cause detrimental/toxic effects. The European Community currently prevents the sale of dog foods containing greater than 28 mg/400 kcal of zinc. However, the United States permits zinc at levels up to 100 mg/400 kcal. Furthermore, it has been reported in Muller and Kirk's *Small Animal Dermatology*, 5th Edition, W.B. Saunders Company, 1995, page 900, the disclosure of which is incorporated by reference herein, that pets that are fed high-quality commercial foods typically receive no benefits from additional supplements. Nonetheless, there is a great demand for products that will enhance or improve skin and coat conditions.

As the skin and coat condition of a pet provides such an important visual impact (in particular to pet owners and/or to the public in general) it is, and has been, of considerable interest to be able to deliver visible enhancements on animals with already good (healthy) skin and coat condition. This has previously not been within the control of pet owners. Furthermore, humans are constantly trying to improve skin and hair conditions. Therefore, it would be desirable to provide a food that enhances the skin coat condition while providing a balanced diet. It would also be desirable to provide a food supplement that enhances the skin coat condition.

SUMMARY OF THE INVENTION

The present invention provides, according to a first aspect, a diet or foodstuff, comprising zinc at a concentration of at least 28 mg/400 kcal and linoleic acid at a concentration of at least 4 g/400 kcal.

The present invention provides, according to another aspect, a diet or foodstuff, comprising zinc at a concentration of at least 20 mg/400 kcal and linoleic acid at a concentration of at least 6 g/400 kcal.

This invention provides a diet or foodstuff having:
A) zinc at a concentration of at least 28 mg/400 kcal and linoleic acid at a concentration of at least 4 g/400 kcal; or
B) zinc at a concentration of at least 20 mg/400 kcal and linoleic acid at a concentration of at least 6 g/400 kcal.

This invention further provides a dietary supplement to supply (A) zinc at a concentration of at least 28 mg/400 kcal and linoleic acid at a concentration of at least 4 g/400 kcal; or (B) zinc at a concentration of at least 20 mg/400 kcal and linoleic acid at a concentration of at least 6 g/400 kcal.

This invention also provides a method to improve or enhance the skin and coat condition by administering a diet or foodstuff having:
A) zinc at a concentration of at least 28 mg/400 kcal and linoleic acid at a concentration of at least 4 g/400 kcal; or
B) zinc at a concentration of at least 20 mg/400 kcal and linoleic acid at a concentration of at least 6 g/400 kcal.

DETAILED DESCRIPTION OF THE INVENTION

Figure 1:
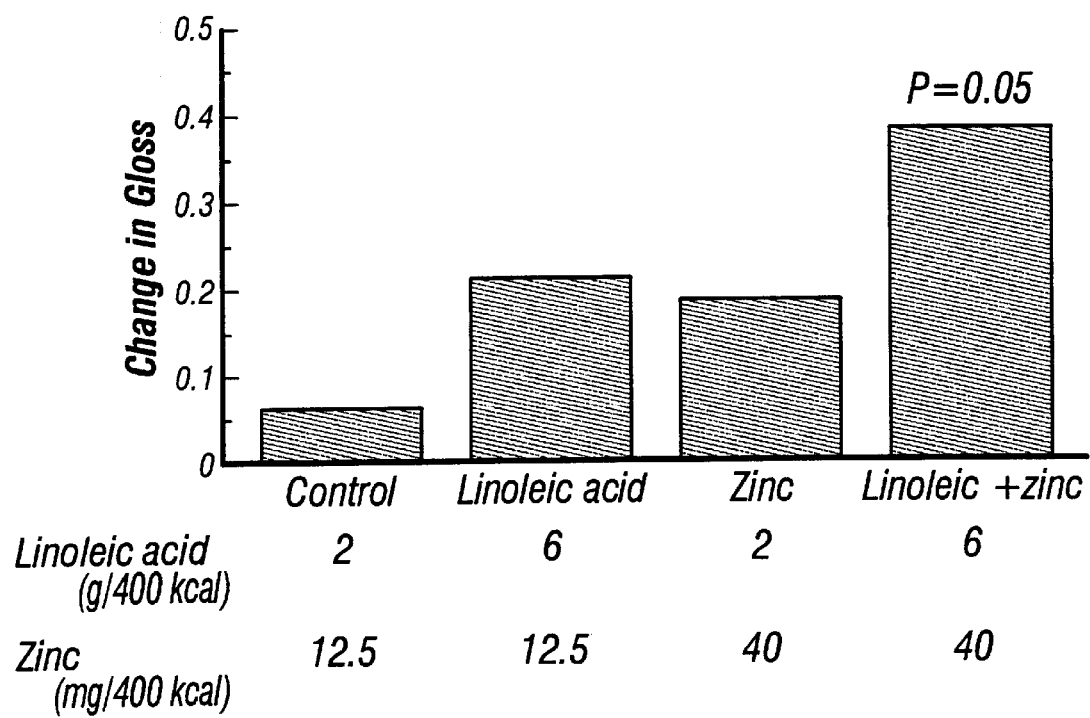
FIG. 1 is a graph showing improvements in coat gloss.

Throughout this text, references to concentrations per kcal are to kcal total metabolizable energy intake. A diet/foodstuff according to the first aspect has been shown to be effective in producing superior skin and coat condition in animals.

Without being limited to theory or the particular mode of action of the invention, it is believed to be effective as follows: Zinc is a part of a number of enzyme systems involved in skin and hair growth; linoleic acid is an essential nutrient for maintenance of the skin's barrier function and the precursor of arachidonic acid, which regulates the turn-over of skin cells. Super-supplementation of a food with a combination of higher than normal levels zinc and linoleic acid provides a) a glossier coat or glossier hair, b) reduced skin scales (dander), and c) improved skin barrier function. The role of the zinc may be associated with the adherence of skin scales and hair scales to each other, while the role of the linoleic acid is thought to be associated with the physical gloss of the hair.

The present invention relates, for all aspects, to any animal, in particular those with substantial hair on the surface of the skin which forms a coat. The invention relates, in particular, to humans, horses, cats, and most preferably to dogs.

The invention provides a dramatic improvement when the high levels of zinc and linoleic acid are used in combination. Such an improvement indicates a degree of synergism between the zinc and linoleic acid. It has been suggested that zinc may augment the metabolism and digestion of polyunsaturated fatty acid, although scientific proof is not yet available.

An aspect of the invention is preferably used in combination with a complete and balanced food (for example, as described in National Research Council, 1985, Nutritional Requirements for Dogs, National Academy Press, Washington D.C., or Association of American Feed Control Officials, Official Publication 1996, the disclosure of each of which is incorporated by reference herein). That is, the concentration levels of zinc and linoleic acid of this invention preferably are used with a high-quality commercial food. As used herein, "high-quality commercial food" refers to a diet manufactured to produce the digestibility of the key nutrients of 80% or more, as set forth in, for example, the recommendations of the National Research Council above for dogs. Similar high nutrient standards would be used for other animals and humans.

One aspect of this invention applies preferentially to a non-human animal diet or foodstuff which is a wet or dry composition (food). Wet food usually describes food which is sold in tins-and has a moisture content of 70 to 90%. Dry food usually describes food which is of a similar composition, but with 5 to 15% moisture and therefore is presented as small biscuit-like kibbles.

The diet or foodstuff can be made according to any method known in the art such as, for example, that described in Waltham Book of Dog and Cat Nutrition, Ed. ATB Edney, Chapter by A. Rainbird, entitled "A Balanced Diet" in pages 57 to 74, Pergamon Press Oxford, the disclosure of which is incorporated by reference herein. The concentrations of zinc and linoleic acid to be added to the diet/foodstuff are calculated on the basis of the energy content of the diet/foodstuff and of any additional nutrients which may be consumed by the animal. Preferably, a complete and balanced food comprises the diet/foodstuff according to the invention.

The zinc and/or linoleic acid may be added at any time during the manufacture/processing of the diet/foodstuff, including at the end, as the last step before packaging.

The concentration of zinc of at least 20 mg/400 kcal and the concentration of linoleic acid of at least 4 g/400 kcal, according to the invention, represent the lower limits of these ingredients. Preferred features of the invention are when one or both of the zinc and linoleic acid concentrations are raised. It is also preferred that one or both of the active constituents of marine fish oils are also present.

As described herein, the concentration of zinc and the concentration of linoleic acid have a degree of synergistic effect. It is preferred that (A) the zinc concentration be at least 28 mg/400 kcal when the concentration of linoleic acid is between about 4 g/400 kcal and about 6 g/400 kcal, and that (B) the concentration of linoleic acid be at least 6 g/400 kcal when the concentration of zinc is between about 20 mg/400 kcal and about 28 mg/400 kcal.

Preferred raised concentrations of zinc and linoleic acid are as follows:

Zinc: 35 mg/400 kcal or above, more preferably 40 mg/400 kcal or above.

Linoleic acid: 5 g/400 kcal or above, more preferably 6 g/400 kcal or above.

These preferred concentrations can be used in any combination, i.e. (A) any concentration of zinc from at least 28 mg/400 kcal can be used with any concentration of linoleic acid from at least 4 g/400 kcal; and (B) any concentration of zinc from at least 20 mg/400 kcal can be used with any concentration of linoleic acid from at least 6 g/400 kcal.

In one embodiment, the zinc concentration is at least 35 mg/400 kcal and the linoleic acid concentration is at least 4 g/400 kcal. In another, the zinc concentration is at least 40 mg/400 kcal and linoleic acid concentration is at least 4 g/400 kcal.

In yet another embodiment, the zinc concentration is at least 35 mg/400 kcal and the linoleic acid concentration is at least 5 g/400 kcal. In another embodiment, the zinc concentration is at least 40 mg/400 kcal and linoleic acid concentration is at least 5 g/400 kcal.

In an embodiment, the zinc concentration is at least 25 mg/400 kcal and the linoleic acid concentration is at least 6 g/400 kcal. In still another embodiment, the zinc concentration is at least 35 mg/400 kcal and the linoleic acid concentration is at least 6 g/400 kcal.

In an embodiment, the zinc concentration is at least 20 mg/400 kcal and linoleic acid concentration is at least 7 g/400 kcal. In another, the zinc concentration is at least 25 mg/400 kcal and the linoleic acid concentration is at least 7 g/400 kcal.

In yet another embodiment, the zinc concentration is at least 35 mg/400 kcal and the linoleic acid concentration is at least 7 g/400 kcal. In another, the zinc concentration is at least 40 mg/400 kcal and the linoleic acid concentration is at least 7 g/400 kcal.

Upper limits of the zinc and linoleic acid concentrations are not restrictive. However, preferred upper limits are: about 100 mg/400 kcal for zinc and about 8 g/400 kcal for linoleic acid.

The active constituents of marine fish oils are eicosapentaenoic acid (EPA) and docosahexanoic acid (DHA). Further advantageous effects of the present invention are noted when one or both of EPA and DHA are present, (preferably both). Inclusion of these constituents in the present invention will further provide for improved skin and coat/hair condition in animals. Pruritus (scratch-itch) is also reduced in non-human animals. Preferred levels of EPA are 250–500 mg/400 kcal, more preferably 300–400 mg/400 kcal. Preferred levels of DHA are 175–400 mg/400 kcal, more preferably 200–300 mg/400 kcal. The preferred concentrations can be used in any combination, i.e. any concentration of EPA can be used in combination with any concentration of DHA. Furthermore, any combination of EPA and DHA can be used in any combination with any concentration of zinc and/or linoleic acid according to the invention.

It has never previously been proposed to incorporate EPA and/or DHA into animal foods for any advantageous effect, particularly at the preferred levels of concentration according to the invention. The basis for this is the possible incorporation of EPA and/or DHA into platelet cell membranes and associated risk of reduced platelet function (blood cloning ability) in animals. The present invention has demonstrated that this is not the case. Evidence based on measurements of prothrombin and partial thromboplastin times have shown that blood cloning is not impaired.

In addition to the above, it has been determined, surprisingly, that inclusion of EPA and/or DHA, particularly at the preferred levels according to the invention does not result in product malodor, animal halitosis or coat malodor. This is surprising because EPA and DHA are the active constituents of marine fish oils and a fishy smell usually results from their use. Since EPA and DHA have anti-inflammatory potential, their inclusion, from a marine fish oil source can be, from a nutritional point of view, extremely advantageous and the perceived risk of pancreatitis, based on the evidence of consumption of high fat diets, does not apply when the total fat consumption of a diet is not increased, as per the present invention.

Of course, the source of EPA and/or DHA for inclusion in the present invention can be from any convenient source.

Marine fish oil typically contains 18% EPA and 12% DHA and is the preferred source for these fatty acids.

The source of zinc or of linoleic acid can also be any convenient source. Preferred zinc sources include zinc sulphate, zinc oxide, organic zinc complexes or a combination of two or more thereof. Preferred linoleic acid sources include safflower oil, sunflower oil, soybean oil, other plant, or animal oils/fats or a combination of two or more thereof.

Since zinc and linoleic acid are ubiquitous in food, it will usually be necessary to determine the concentration of each which is present in the ingredients of the diet/foodstuff and then add sufficient quantities to bring the total concentration of each up to the required levels, according to the invention.

According to another aspect of the invention there is provided a dietary supplement which, in addition to other nutrient intake., supplies (A) a total zinc concentration of at least 28 mg/400 kcal and a total linoleic acid concentration of at least 4 g/400 kcal or (B) a total zinc concentration of at least 20 mg/400 kcal and a total linoleic acid concentration of at least 6 g/400 kcal. This aspect of the invention is particularly useful to supplement a diet/foodstuff that does not contain sufficiently high levels of zinc/linoleic acid (according to the invention). The concentrations of zinc/linoleic acid in the diet/foodstuff can easily be determined by typical or guaranteed analysis declared by the manufacturer either on the label or in supplementary material, or by well-known methods of nutritional analysis of the diet. The required amount of supplement can be added to the animal's diet in accordance with the minimum total concentration amounts of this invention per 400 kcal of food energy. This can be done by including a quantity of the supplement with the animal's diet or by additionally feeding a quantity of the supplement to the animal.

The supplement can be formed as a foodstuff with higher levels of zinc/linoleic acid which requires "dilution" before feeding to an animal. The supplement may be in any form, including solid (e.g. a powder), semi-solid (e.g. a food-like consistency/gel) or a liquid. The liquid form can conveniently be mixed in with food or fed directly to the animal, for example via a spoon or via a pipe-like device. The supplement can be high in both linoleic acid and zinc or can be a combined pack of at least two components, having the required concentration of zinc and linoleic acid separately.

All features of the first aspect of the invention, as described above, also apply to the second aspect of the invention.

According to one embodiment of this invention, a dietary supplement supplies a total zinc intake of at least 35 mg/400 kcal and the total linoleic acid of at least 4 g/400 kcal. In another embodiment, the total zinc intake supplied is at least 40 mg/400 kcal and the total linoleic acid supplied is at least 4 g/400 kcal.

In another embodiment, a dietary supplement supplies a total zinc intake of at least 28 mg/400 kcal and the total linoleic acid supplied is at least 5 g/400 kcal. Another embodiment supplies a total zinc intake of at least 28 mg/400 kcal and the total linoleic acid supplied is at least 6 g/400 kcal.

In another embodiment, a dietary supplement further supplies a total eicosapentaenoic acid concentration in the range of from about 250 mg/400 kcal to about 500 mg/400 kcal, in addition to other nutrient intake. In still another embodiment, a dietary supplement further supplies in addition to other nutrient intake a total docosahexanoic acid concentration in the range of from about 175 mg/400 kcal to about 400 mg/400 kcal.

The dietary supplement can be in any convenient form such as, for example, liquid, solid, or powder form. As described above, the zinc can be incorporated in any convenient form such as, for example, zinc sulphate, zinc oxide, organic zinc complexes, or a combination of two or more thereof. The linoleic acid can be incorporated in any convenient form such as, for example, safflower oil, sunflower oil, soybean oil, or a combination of two or more thereof.

A further aspect of the invention provides a composition for topical administration to animals comprising zinc and linoleic acid at elevated levels.

The composition can be applied from one source or from more than one. For example, a combined pack having a source of zinc and a source of linoleic acid.

The topical composition is applied to the animal's coat or hair by any convenient method such as, for example, the usual manners commonly used for topical application of an ointment or hair conditioner. The composition is most suitably in liquid or in powder form.

The present invention also provides, according to a fourth aspect, a diet or foodstuff for all features of that aspect, a dietary supplement as set out for all features of that aspect, and a composition as set out for all features of that aspect, for use in enhancing and/or improving the skin and coat condition of an animal. That is, this invention provides a method to enhance and/or improve the skin and coat condition of an animal by the administering of a diet, foodstuff, dietary supplement, or composition as described above.

A fifth aspect of the invention also provides for the use of all features of the first, second and third aspects of the invention for enhancing and/or improving the skin and coat condition of an animal.

The invention is cosmetic in that it produces its effect in normal/healthy animals with good skin and coat condition, as well as those with dry scaly skin. The invention does not relate to the correction of real or marginal deficiencies, rather, it provides performance enhancement for healthy animals and can do so via a complete and balanced diet. It delivers visible enhancement on animals with already good skin and coat hair condition.

Accordingly, while this invention can be administered to animals with poorer than normal health, such administration will initially serve to bring the animal back to normal health through the benefits that follow from ingesting a good diet. At the point where the animal has attained normal health, then this administration or application of this invention will enhance and/or improve the skin and coat condition further.

Improvements in skin and coat conditions according to the invention may also be associated with improved skin barrier function by the reduction of trans-epidermal water loss.

Improvements in skin and coat condition, according to the invention, may be determined by a quantitative descriptive analysis panel. This panel involves a specialist group of people to assess a number of characteristics of the animals being tested. This form of analysis is currently used in the cosmetics and health-care products in industry evaluation of and is described as follows:

The Quantitative Descriptive Analysis Panel

The following document identifies the methodology used to set up the Quantitative Descriptive Analysis (QDA) panel. It includes a description of the recruitment, training, validation and every day running of the panel.

1. The History

During 1994 and 1995, when the first skin and coat projects were getting underway, a panel of 15 associates were used to assess the condition of the cats' and dogs' coats in an attempt to provide a benchmark against how well products were feedings. The panel proved to be highly variable and lacked consistency. Some individuals showed biases. Data points were also frequently missing, due to individuals being unable to attend assessment sessions, as a result of prior engagements. Analysis of this poor quality data was difficult and never showed any statistical differences because of the noisy data.

A specialist panel of people was therefore required to assess the cats and dogs, and a consistent method of assessment was adopted.

2. The Recruitment

It was essential to identify individuals who were interested in their task, and that were motivated to carry out a thorough assignment for the duration of the trial. For any animal assessments it was essential that potential recruits:

i) were comfortable with handling animals, although they did not have to be animal owners themselves, ii) did not suffer from any allergies which may affect their ability to carry out the assessments, iii) did not suffer from abnormal color vision—there were tests available to monitor for color blindness and discrimination of color, iv) had normal eyesight (with correction if necessary) and, if glasses were worn for close work, they should be worn for the assessments, v) were able to devote time to the assessments for the duration of the trial, vi) although not essential, it was useful if the group selected cover a broad age range; including both sexes had advantages in forming a balanced group, vii) were identified as having good senses, viii) had skills during recruitment such as, teamwork, decision making and judgement, commitment and inter-personal effectiveness; these skills were essential if the panel were to succeed.

In the cases where the assessors were animal owners, care was taken to ensure that, if a trial animal had the same visual appearance (e.g. color or breed) as that owned, there was no favorable bias in scoring.

3. Assessor Training

A small, well-trained panel is much better than a large untrained panel. For a dog study 20 potential candidates were selected, who demonstrated the necessary skills (listed above—section viii) at interview. These 20 people then began a training course, lasting approximately 12 hours over 3 days. During the first day the panel members were introduced to the principles of assessment with 5 reference cats. The assessors were then asked to assess 8 cats, of differing colors and coat types, two of which were the same cat (we pretended they were sisters).

This test monitored the consistency of individuals, looked at their ability to use the scale properly and were used to compare their score against the panel mean to eliminate any biases. They were also asked to smell 3 dogs and rank them in order of offensiveness. This gave us an indication of how well the assessors handled the dogs and cats and an indication of their sensory skills. The best 10 assessors were selected to complete the next training session.

Day two involved assessing the same 8 cats, to see how repeatable the assessors were. They also completed a more complex odor recognition test and odor ranking test, to identify how sensitive their noses were. The best 5 assessors were then recruited onto the panel.

Day 3 involved more open discussions around the parameters to be assessed. This encouraged the group to get to know each other and learn to work together, as a team. Some time was also spent evaluating the Reference Animals, a group of animals (preferably fed the same diet) which represented extremes of the scale in terms of coat condition.

These Reference Animals are also assessed at the beginning of each assessment for half an hour. This provided the forum for a discussion to ensure they were all in agreement. A panel leader ran this discussion, to ensure that the quieter assessors gave their views and did not just agree with the more dominant ones.

4. Presentation of Animals

The animal were assessed in a random order, at each assessment stage, to eliminate any bias towards the first or last animals presented.

Between each assessment the assessors wiped their hands with an alcohol tissue or washed them with soap and water.

Each animal were examined by the assessors as a group but, to avoid any effect of changes in coat texture during handling, the assessors did not touch each animal in the same sequence.

Each animal was only identified by an unmemorable number, not by name. This prevented any subconscious favoritism and prevented recall of previous scores.

Each animal was assessed under identical conditions, preferably indoors, to provide an even and consistently lit area.

Prior to evaluation, the coat was combed evenly all over, in a standardized manner, to eliminate the influence of any disturbances in the way the coat was lying. A clean comb was used for each animal. Combs were degreased in alcohol or methylated spirits.

5. Assessment Considerations

The sensory evaluation techniques relied upon a critical judgement made on each occasion. The assessors understood that they were making an independent evaluation of an animal on a specific occasion. The assessors were blind to all treatment groups that the animals may belong to. There was no harm however in giving some information about the trial e.g. something had been added to the diets of some of the animals to see if it had any effects on any aspects of the animals' coat condition. They may had help to keep their interest levels high and made them feel they were doing a worthwhile job.

The scoring system to be used comprised a numerical scale for each parameter under evaluation. The scale was a simple category scale with a minimum of 5 categories for the purpose of statistical analysis. The scale currently used by the QDA panel appears to be a line scale, but is in fact used as a category scale i.e. crosses are only marked on the whole and half numbers and not anywhere along the line.

6. Assessment Parameters

1. Gloss—this was evaluated before touching the animal, so that the texture of the coat did not influence the assessor. The coat was examined for the extent of light reflected from the coat. The darker colored coats will naturally reflect more light than the lighter coats, but the mixed colored coats e.g. a brindle dog, tortoiseshell cat, or roan horse can cause confusion and variability. These were excluded from the trial if possible and ideally used one color of animal only. If this was not possible, the panel simply judged the gloss reflected from the different colored areas and gave an average score.

2. Softness—if possible the assessors did not just stroke the coats, but also got their fingers into the coat so that the true feel of the coat was detectable. In the case of horses this may not be possible if they were clipped, but in conjunction with an assessment of the softness of the mane and/or tail a better picture may be given. This highlights the importance of ensuring the grooming practices for each animal was identical, and if one was clipped they should all be clipped.

3. Grease/Dryness—this parameter can be assessed at the same time as softness. Very often a greasy or dry feel are confused, hence the QDA panel assessed grease and dryness against an optimum feel.

4. Scale—the animal's body needed to be visually sectioned off into six areas. Assessments were carried out, section by section, lifting the hairs in the opposite direction of growth, examining the skin and base of the hairs for signs of flaking. Note that lighter coats may need very careful inspection. The scores, for each section, were then summed for the whole body and translated onto the scoring line. By dividing the body into six, the most accurately scored parameter was created.

5. Erythema—an especially important parameter to assess when testing topical products to ensure no irritation occurs.

A sixth aspect of the invention provides a process for the preparation of any of the first, second or third aspects of the invention. The process comprises mixing together the ingredients, optionally heating to cook any raw food ingredients and presenting the mixture in a form suitable for consumption or administration to an animal.

As previously discussed, the zinc and linoleic acid (all or some of the required total) can be introduced into the mixture at any stage. Preferably the diet or foodstuff is a wet or dry product. Preferably, the supplement and/or composition is a powder or liquid.

The Examples which follow are intended as an illustration of certain preferred embodiments of the invention, and no limitation of the invention is implied.

Figure 2:
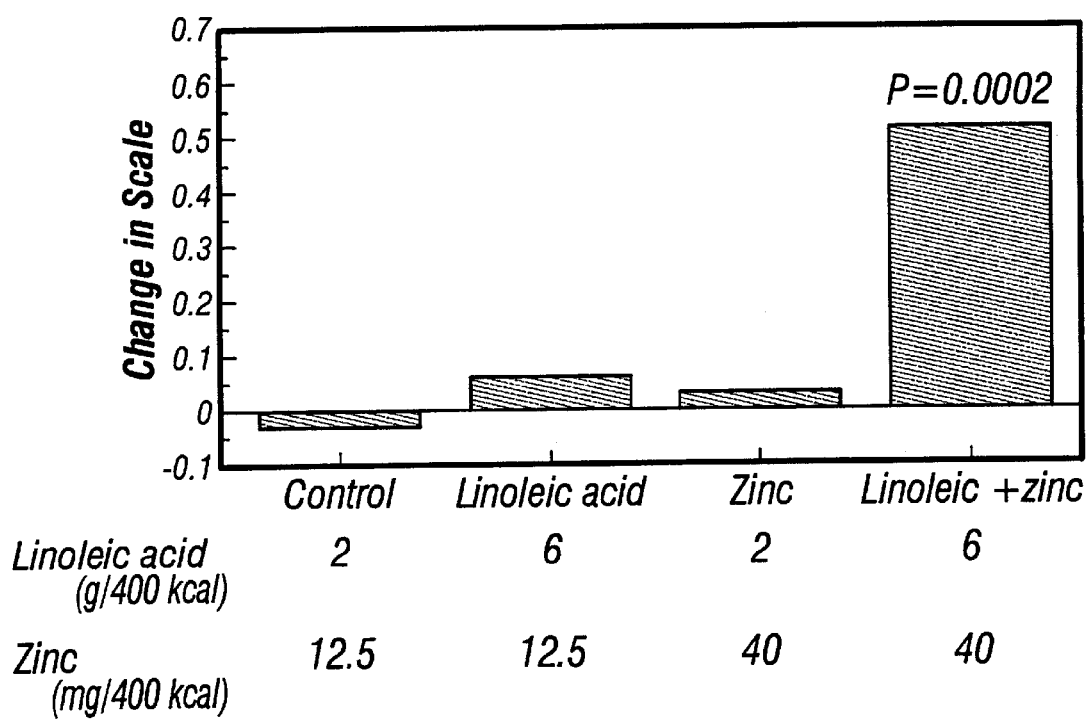
FIG. 2 is a graph showing improvements in coat scale.
Figure 3:
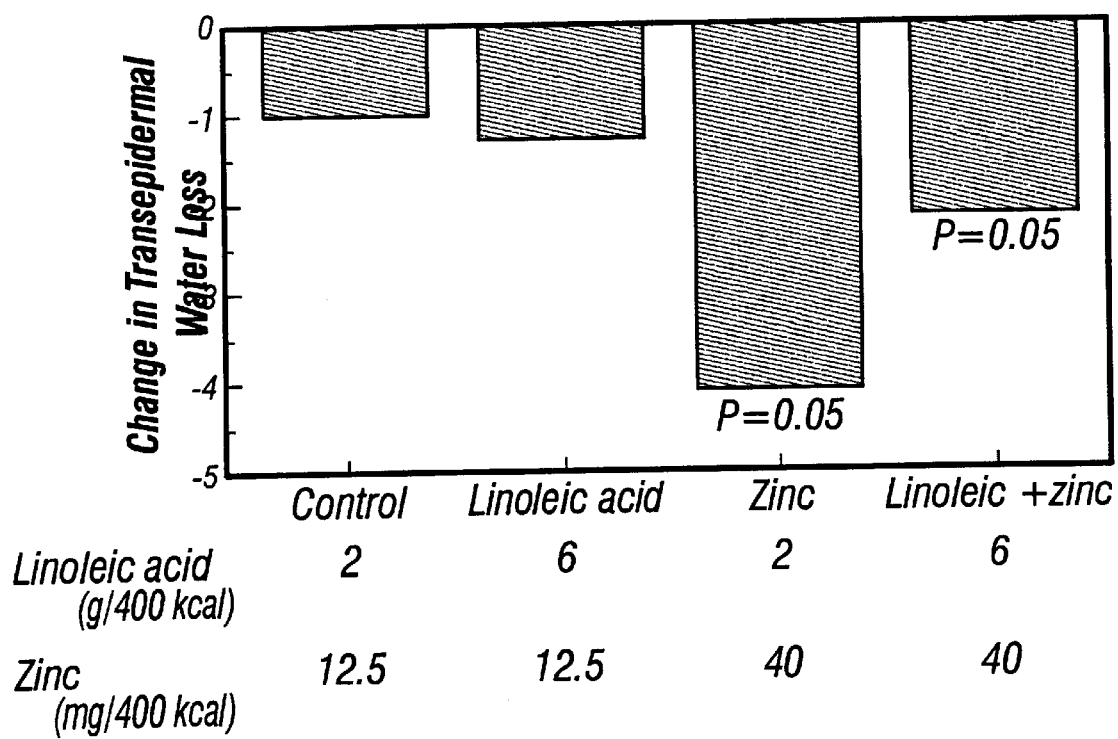
FIG. 3 is a graph showing the reduction in trans-epidermal water loss and improvements in skin barrier function.

The present invention is described with reference to the drawings relating to Example 1, of which:

FIG. 1 is a graph showing improvements in coat gloss.
FIG. 2 is a graph showing improvements in coat scale.
FIG. 3 is a graph showing the reduction in trans-epidermal water loss and improvements in skin barrier function.

The invention will now be described with reference to the following non-limiting examples:

EXAMPLE 1

Summary

This trial evaluated linoleic acid and zinc as nutritional drivers of superior skin and coat condition.

32 Labrador Retriever dogs were initially fed a complete balanced diet (see below) for nine weeks. Labradors were used as they are a breed with relatively constant coat color thereby avoiding any differences in gloss which could be attributed to differences in coat color. The following nine weeks they were divided into four groups offered either the complete balanced diet alone or supplemented with linoleic acid, zinc or a combination of the two.

Levels of linoleic acid and zinc in the control and test diets were 1.8 or 6 g/400 kcal and 12.5 and 40 mg/400 kcal, respectively.

The parameters evaluated included the visual assessment of coat quality by trained assessors and trans-epidermal water loss.

No significant differences were detected between diets in coat softness or optimum coat feel.

A significant increase (p=0.05) in coat gloss was observed in the group supplemented with the combination of zinc plus linoleic acid compared to the control group.

Supplementation with zinc plus linoleic acid was also associated with a substantial and significant (p=0.0002) improvement in skin scale.

There was a significant decrease (p=0.05) in the trans-epidermal water loss of the dogs skin in the groups supplemented with either zinc or linoleic acid plus zinc which was not seen in the control group.

These data clearly demonstrate that increased dietary zinc and linoleic acid intakes are associated with significant and substantial improvements in skin and coat condition and skin barrier function.

Composition of Complete Balanced Diet

| Ingredient | Inclusion |
| --- | --- |
| Rice | 24.9% |
| Whole corn | 18.8% |
| Whole grain wheat | 12.2% |
| Chicken by-product meal | 18.7% |
| Corn gluten meal | 9.5% |
| Brewers yeast | 1.7% |
| Dried egg | 0.8% |
| Non-iodized salt | 0.7% |
| Vitamin premix | 3.4% |
| Sunflower oil | 0.5% |
| Beef tallow | 4.9% |
| Poultry viscera | 4.4% |

Analytical profile—moisture 8.2%, protein 26.4%, fat 10.4%, ash 7.1%, fibre 2.2%.

Methods

1. Trial Set-up a) Animals, Location and Feeding.

The trial was conducted in Dog Care 6 at WCPN utilizing 32 adult Labradors (31 black, 1 yellow) which were divided into four panels (yellow dog placed in control group), matched for age, gender and coat condition. The dogs were fed to maintain their bodyweight and therefore bodyweights were monitored weekly. Amounts offered were adjusted to compensate for any excessive gain or loss of bodyweight.

b) Trial Design.

All four panels of dogs were offered the standard complete balanced diet so that all panels were standardized with respect to skin and coat condition. Immediately following this preferred each panel of dogs was fed with either the standard complete balanced diet or one of the supplemented test diets, for an additional nine weeks, as outlined in Table 1 below.

TABLE 1

Trial Design of Phase I

| Test Weeks | Period | Panel 1 | Panel 2 | Panel 3 | Panel 4 |
| --- | --- | --- | --- | --- | --- |
| 0–9 | Preferred | Stndrd Diet | Stndrd Diet | Stndrd Diet | Stndrd Diet |
| 10–18 | Phase I | Stndrd Diet | Stndrd Diet + linoleic acid | Stndrd Diet + zinc | Stndrd Diet + linoleic acid + zinc | c) Foods

A single batch of complete balanced diet was made up. Analysis of the diet revealed a zinc level of 12.5 mg/400 kcal as specified. Zinc supplementation was added at the time of feeding in the form of zinc sulphate.

Linoleic acid was added directly to the diet at the time of feeding in the form of safflower oil (78% linoleic acid). The two groups of dogs receiving the safflower oil supplement had their food intakes adjusted to compensate for the increased energy intake from the oil.

The final levels of zinc and linoleic acid presented to the animals are indicated in Table 2 below, as measured by the techniques described in Appendix III. Essential fatty acid/linoleic acid levels were determined using gas/liquid chromatography. Zinc levels were quantified by atomic absorption spectrophotometry. Both methods are approved by the National Accreditation of Measurement and sampling which is governed by the UK Accreditation Service.

TABLE 2

Levels of zinc and linoleic acid presented daily

|  | Zinc (mg/400 kcal) | Linoleic acid (g/400 kcal) |
|---|---|---|
| Standard Level | 12.5 | 1.8 |
| Test Level | 40 | 6 | d) Grooming.

As grooming has a major impact on coat condition, a regular pattern of grooming was followed throughout the trial. All dogs were uniformly groomed once weekly and bathed with shampoo three weeks before the end of the preferred.

2. Parameters Measured a) Daily Intake

The energy requirement of each animal was calculated at the beginning of each feeding stage and the amount offered was adjusted accordingly. Individual food intakes were recorded daily for each dog. Individual weekly bodyweights were measured to monitor and correct any over- or under-feeding.

b) Sensory Evaluation of Coat Condition.

The Quantitative Descriptive Analysis (QDA) panel was composed of five women who have been selected and trained, in house, to provide accurate and precise assessments of coat quality (for details refer to QDA described earlier).

coat gloss was measured before any manual examination of the animal was carried out. Gloss was assessed by scoring the amount of light reflected from the coat.

Coat softness is a measure of the feel of the coat when the assessors run fingers through the full thickness of the coat.

Optimum coat feel is an absence of either a greasy or a dry feel of the coat (as often the two are indistinguishable on the basis of feel alone) and was measured at the same time as the softness. This parameter is subdivided into two measurements; along the top of the back and along the flanks, as there is variability between these areas.

Scale (dander) on the animals coat was an undesirable quality and is measured by visually assessing the amount of scale present in three different sections of the dogs' coat.

Each of the five parameters was assessed in each dog twice at the end of the preferred (week 8 and week 9) and twice at the end of the test phase (week 17 and week 18).

c) Trans-epidermal Water Loss

Skin hydration was evaluated by measuring the conductivity of the skin using a dermal phase meter which yields a direct measure of the hydration of the stratum corneum. Continuous measurements taken over a 30 second period provide an indirect measure of trans-epidermal water loss. Measurements were taken in duplicate at the end of the preferred stage (weeks 8 and 9) and at the end of the test phase (weeks 17 and 18) from the inner surface of both left and right ears. These provide a direct assessment of skin barrier function.

3. Data Analysis and Presentation.

All results are presented as the change in parameters from the end of the preferred (mean of weeks 8 and 9) to the end of the test phase (mean of weeks 17 and 18). Statistical differences between the changes observed in each panel were assessed by one-way analysis of variance (ANOVA). Statistical significance was reached when p is equal to or less than 0.05).

Results

No significant changes in either coat softness or optimum coat feel of the dogs were detected in this study following the addition of zinc, linoleic acid or a combination of the both in the diet, when compared to the control diet.

Statistical analysis compared the changes in coat gloss, from the end of the preferred to the end of the test phase, between each of the different diets by one-way ANOVA. All three test panels showed an increase in coat gloss compared to the control group (FIG. 1). The increases observed in the zinc group and the zinc plus linoleic acid group appeared to be additive when both supplements were delivered in combination, such that the dogs supplemented with the combination demonstrated a large (0.4 units on a 1 to 5 scale) and significant ($p=0.05$) increase in coat gloss (when compared to control group).

Changes in coat scale from the beginning to the end of the test phase was also analyzed using one-way ANOVA to compare differences between diets. Note that a positive value represents a reduction in the amount of scale in the coat. Dogs supplemented with zinc or linoleic acid alone and those in the control group showed no reduction in the amount of scale present over the test period (FIG. 2). The group of dogs supplemented with the combination of zinc plus linoleic acid demonstrated a substantial (0.53 units) and significant ($p=0.0002$) improvement in coat scale (when compared to control group) representing a synergistic rather than additive effect.

During the test phase, dogs in the control group and those supplemented with linoleic acid alone showed no significant change in trans-epidermal water loss (TEWL; FIG. 3). However, there was a trend for zinc to reduce TEWL over the test period. Supplementation with zinc was associated with a large, significant ($p=0.05$) decrease in TEWL over the test period. Supplementation with the combination of linoleic acid plus zinc also showed a moderate but significant ($p=0.05$) decrease in TEWL at the end of the test phase compared to the TEWL at the start of the test phase.

The results from all parameters are summarized in Table 3 below.

TABLE 3

Summary of results

| Parameter | Linoleic Acid | Zinc | Linoleic + Zinc |
|---|---|---|---|
| Gloss | ←→ | ←→ | ↑ |
| Softness | ←→ | ←→ | ←→ |
| Scale | ←→ | ←→ | ↓ |
| Optimum Coat Feel | ←→ | ←→ | ←→ |
| Trans-epidermal Water Loss | ←→ | ↓ | ↓ |

Key:
←→ no change
↓ decrease
↑ increase

Discussion

Gloss is considered to be the major parameter in the assessment of coat condition as it is the first and most striking impression given by the dog. In this study the mean increase in gloss observed in the zinc plus linoleic acid group approached half a unit on a 1 to 5 scale. This magnitude of improvement is one that is easily and reproducibly distinguished by the QDA panel and would be detected by dog owners.

The dramatic improvement in scale observed in the group of dogs that received the combination of zinc plus linoleic acid, which was not seen in the other groups, indicates there is a degree of synergism involved when the supplements are combined.

Zinc was shown to play a significant role in the reduction of trans-epidermal water loss in this study as well as in the previous phase I. These results are indicative that zinc is active in improving skin health by boosting the cutaneous barrier function and therefore reducing the risk of dry scaly skin. This may explain the effects of zinc in reducing skin scale.

The results from this study represent the first research able to show that supplementation of a complete and balanced professional dog food, with zinc and linoleic acid concentrations in excess of those required to prevent deficiency, can make significant and substantial enhancements in the skin and coat condition of animals.

Conclusions

The rationale and the protocols used in this study have shown to be a valid and effective method for assessing the effect of nutrients on skin and coat condition. This method can now be extended with the confident knowledge that nutrients which play a part in improving skin and coat condition can be identified by this protocol. Zinc and linoleic acid have been identified in this study as ingredients involved in the promotion of superior skin and coat condition when provided in addition to an already balanced premium quality animal food.

EXAMPLE 2

In another study, a test diet similar to Example 1 supplied zinc at a concentration 25 mg/400 kcal of food energy, and linoleic acid at a concentration of 6 g/kcal of food energy. The evaluation and test protocol was as described above for Example 1.

It was found that the combination of 25 mg/400 kcal of zinc and 6 g/kcal of linoleic acid provided excellent enhancement of skin and coat condition properties.

EXAMPLE 3

The Effect of Dietary Supplementation of Marine Fish Oils on Blood Coagulation Parameters of Adult Dogs Introduction This trial was carried out to test the safety of supplementing animal diets with relatively high amounts of marine fish oils (MFO). Marine fish oils, containing Eicosapentaenoic acid (EPA) and Docosahexanoic acid (DHA) in particular, have been found to have an anti-inflammatory effect in humans and animals. They have also been shown to increase blood coagulation times at very high levels, which is an unacceptable adverse effect. In order to exploit the anti-inflammatory effects of these fatty acids in animals, particularly dogs, it was necessary to test their safety. This was done by feeding double the amount of MFO that would have to be fed for an anti-inflammatory effect over a six month period. During this time blood samples are taken to monitor coagulation function.

Material and Methods

Six yellow coated Labradors retrievers were put on a six month diet of the previously described complete balanced diet with 4.67 g/400 kcal MFO inclusion. This corresponds to 489 mg/400 kcal EPA and 356 mg/400 kcal DHA in the finished product. The animals were fed to body weight maintenance.

Before feeding the diet, blood samples were collected for coagulation tests to establish a baseline. This was done at 21, 14 and 1 day before the start of diet. Subsequently, blood samples were taken every 4 weeks for coagulation tests.

The coagulation parameters that were measured were platelet count (platC), prothrombin time (prothrT), partial thromboplastin time (ptT) and fibrinogen (F). ProthrT and ptT are dynamic measurements of changes in coagulation times that would be expected to be influenced by the MFO in the diet.

Results

No adverse clinical events were reported and no abnormalities were found in any animal on veterinary examination.

The mean results (± standard error) for the 6 animals are shown in Table 4 below for the four coagulation parameters.

TABLE 4

| week | platelet count ($10^9$/l) | prothrombin time (seconds) | thromboplastin time (seconds) | fibrogen (g/l) |
|---|---|---|---|---|
| −3 | 290 ± 32 | 9.0 ± 0.2 | 15.9 ± 0.7 | 1.4 ± 0.2 |
| −2 | 277 ± 27 | 9.0 ± 0.1 | 13.8 ± 0.3 | 1.8 ± 0.2 |
| 0 | 283 ± 25 | 9.3 ± 0.3 | 12.3 ± 0.3 | 1.5 ± 0.2 |
| 4 | 293 ± 25 | 9.3 ± 0.3 | 11.3 ± 0.4 | 1.3 ± 0.2 |
| 8 | 273 ± 24 | 9.1 ± 0.4 | 14.0 ± 0.8 | 1.8 ± 0.3 |
| 12 | 300 ± 26 | 10.3 ± 0.2 | 18.7 ± 0.5 | 1.1 ± 0.1 |
| 16 | 251 ± 27 | 8.2 ± 0.1 | 13.6 ± 0.4 | 1.0 ± 0 |
| 20 | 268 ± 44 | 8.7 ± 0.1 | 12.3 ± 0.8 | 1.3 ± 0.1 |
| 24 | 268 ± 30 | 9.3 ± 0.2 | 14.3 ± 0.5 | 1.8 ± 0.1 |
| Normal Range | 150–450 | 6–11 | 10–20 | 1.0–4.0 |

At no time were any of the parameters from any individual dog out of the normal ranges.

There was no perceivable increase in halitosis or coat malodor specifically of a fishy nature.

Conclusions

As the purpose of this trial was to assess the safety of long-term feeding of MFO at relatively high inclusion levels, it is important to note that none of the animals were taken off trial because of health reasons. Furthermore, none of the mean values of the parameters increased or decreased to outside their normal range.

No adverse effects on clotting function were found as a result of long-term feeding of a diet containing amounts of MFO in excess of double those required for anti-inflammatory effects.

There was no perceivable increase in halitosis or coat odor as a result of the inclusion of MFO in the diet.

MFO can be used in our diets at the levels according to the invention without adverse effects.

Other variations and modifications of this invention will be apparent to those skilled in this art after careful study of this application. This invention is not to be limited except as set forth in the following claims.

What is claimed:

1. A diet or foodstuff, for an animal, comprising synergistic effective amounts of:
   A) zinc at a concentration of at least 28 mg/400 kcal and linoleic acid at a concentration of at least 4 g/400 kcal; or
   B) zinc at a concentration of at least 20 mg/400 kcal and linoleic acid at a concentration of at least 6 g/400 kcal.

2. A diet or foodstuff according to claim 1, wherein the zinc concentration is at least 35 mg/400 kcal and the linoleic acid concentration is at least 4 g/400 kcal.

3. A diet or foodstuff according to claim 1, wherein the zinc concentration is at least 40 mg/400 kcal and linoleic acid concentration is at least 4 g/400 kcal.

4. A diet or foodstuff according to claim 1, wherein the zinc concentration is at least 35 mg/400 kcal and the linoleic acid concentration is at least 5 g/400 kcal.

5. A diet or foodstuff according to claim 1, wherein the zinc concentration is at least 40 mg/400 kcal and linoleic acid concentration is at least 5 g/400 kcal.

6. A diet or foodstuff according to claim 1, wherein the zinc concentration is at least 25 mg/400 kcal and the linoleic acid concentration is at least 6 g/400 kcal.

7. A diet or foodstuff according to claim 1, wherein the zinc concentration is at least 35 mg/400 kcal and the linoleic acid concentration is at least 6 g/400 kcal.

8. A diet or foodstuff according to claim 1, wherein the zinc concentration is at least 20 mg/400 kcal and linoleic acid concentration is at least 7 g/400 kcal.

9. A diet or foodstuff according to claim 1, wherein the zinc concentration is at least 25 mg/400 kcal and the linoleic acid concentration is at least 7 g/400 kcal.

10. A diet or foodstuff according to claim 1, wherein the zinc concentration is at least 35 mg/400 kcal and the linoleic acid concentration is at least 7 g/400 kcal.

11. A diet or foodstuff according to claim 1, wherein the zinc concentration is at least 40 mg/400 kcal and the linoleic acid concentration is at least 7 g/400 kcal.

12. A diet or foodstuff according to claim 1, wherein said animal is a dog, cat, horse or human.

13. A diet or foodstuff according to claim 1, further including eicosapentaenoic acid at a concentration in the range of from about 250 mg/400 kcal to about 500 mg/400 kcal.

14. A diet or foodstuff according to claim 1 or 13, further including docosahexanoic acid at a concentration in the range of from about 175 mg/400 kcal to about 400 mg/400 kcal.

15. A diet or foodstuff according to claim 1, wherein the zinc includes zinc sulphate, zinc oxide, organic zinc complexes, or a combination of two or more thereof.

16. A diet or foodstuff according to claim 1, wherein the linoleic acid is incorporated in safflower oil, sunflower oil, soybean oil, or a combination of two or more thereof.

17. A dietary supplement to a nutrient intake of an animal, said dietary supplement supplying, for each 400 kcal of said nutrient intake comprising synergistic effective amounts of:
   A) zinc at a total concentration of at least 28 mg/400 kcal and linoleic acid at a total concentration of at least 4 g/400 kcal; or B) zinc at a total concentration of at least 20 mg/400 kcal and linoleic acid at a total concentration of at least 6 g/400 kcal.

18. A dietary supplement according to claim 17, wherein the total zinc intake is at least 35 mg/400 kcal and the total linoleic acid is at least 4 g/400 kcal.

19. A dietary supplement according to claim 17, wherein the total zinc intake is at least 40 mg/400 kcal and the total linoleic acid is at least 4 g/400 kcal.

20. A dietary supplement according to claim 17, wherein the total zinc intake is at least 28 mg/400 kcal and the total linoleic acid is at least 5 g/400 kcal.

21. A dietary supplement according to claim 17, wherein the total zinc intake is at least 28 mg/400 kcal and the total linoleic acid is at least 6 g/400 kcal.

22. A dietary supplement according claim 17, wherein said animal is a dog, cat, horse or human.

23. A dietary supplement according to claim 17, in addition to other nutrient intake, further supplies a total eicosapentaenoic acid concentration in the range of from about 250 mg/400 kcal to about 500 mg/400 kcal.

24. A dietary supplement according to claim 17 or 23, in addition to other nutrient intake, further supplies a total docosahexanoic acid concentration in the range of from about 175 mg/400 kcal to about 400 mg/400 kcal.

25. A dietary supplement according to claim 17, further being in liquid, solid, or powder form.

26. A dietary supplement according to claim 17, wherein the zinc is incorporated in zinc sulphate, zinc oxide, organic zinc complexes, or a combination of two or more thereof.

27. A dietary supplement according to claim 17, wherein the linoleic acid is incorporated in safflower oil, sunflower oil, soybean oil, or a combination of two or more thereof.

28. A process for the preparation of the diet or foodstuff according to claim 1, comprising:
   mixing together the ingredients to yield a mixture, optionally heating the mixture to cook any raw food ingredients; and
   forming the mixture into a form suitable for consumption.

29. A process for the preparation of the dietary supplement according to claim 17, comprising:
   mixing together the ingredients to yield a mixture, optionally heating the mixture to cook any raw food ingredients; and
   forming the mixture into a form suitable for administration.

30. A method for enhancing and/or improving the skin and coat condition of an animal comprising the step of causing the regular ingestion by the animal of the diet or foodstuff according to claim 1.

31. A method for enhancing and/or improving the skin and coat condition of an animal comprising the step of causing the regular ingestion by the animal of the dietary supplement according to claim 17.

32. A diet or foodstuff, for an animal, comprising synergistic effective amounts of:
   A) zinc at a concentration from at least 28 mg/400 kcal to at least 40 mg/400 kcal and linoleic acid at a concentration from at least 4 g/400 kcal to at least 6 g/400 kcal; or
   B) zinc at a concentration of at least 20 mg/400 kcal and linoleic acid at a concentration of at least 6 g/400 kcal.

33. A dietary supplement to a nutrient intake of an animal, said dietary supplement supplying, for each 400 kcal of said nutrient intake comprising synergistic effective amounts of:
   A) zinc at a concentration from at least 28 mg/400 kcal to at least 40 mg/400 kcal and linoleic acid at a concentration from at least 4 g/400 kcal to at least 6 g/400 kcal; or
   B) zinc at a total concentration of at least 20 mg/400 kcal and linoleic acid at a total concentration of at least 6 g/400 kcal.

* * * * *